US007059178B2

(12) United States Patent
Fischer et al.

(10) Patent No.: US 7,059,178 B2
(45) Date of Patent: Jun. 13, 2006

(54) DEVICE FOR MEASURING A TIRE PRESSURE

(75) Inventors: Martin Fischer, Regensburg (DE); Dominique Luce, Toulouse (FR); Franz Hillenmayer, Burglengenfeld (DE)

(73) Assignee: Siemens Aktiengesellschaft, Munich (DE)

( * ) Notice: Subject to any disclaimer, the term of this patent is extended or adjusted under 35 U.S.C. 154(b) by 132 days.

(21) Appl. No.: 10/265,336

(22) Filed: Oct. 4, 2002

(65) Prior Publication Data

US 2003/0066343 A1 Apr. 10, 2003

(30) Foreign Application Priority Data

Oct. 4, 2001 (DE) ................. 101 48 876

(51) Int. Cl.
G01M 17/02 (2006.01)

(52) U.S. Cl. .......................... 73/147; 340/447

(58) Field of Classification Search ............... 73/146, 73/146.2, 146.3, 146.5, 146.8, 146.4; 340/447
See application file for complete search history.

(56) References Cited

U.S. PATENT DOCUMENTS 5,285,189 A * 2/1994 Nowicki et al. ............ 340/447
5,600,301 A * 2/1997 Robinson, III .............. 340/442
5,838,229 A * 11/1998 Robinson, III .............. 340/442
5,987,980 A * 11/1999 Mangafas et al. .......... 73/146.8
6,055,855 A * 5/2000 Straub ....................... 73/146.8
6,101,870 A * 8/2000 Kato et al. ................. 73/146.8
6,199,575 B1* 3/2001 Widner ....................... 137/227
6,246,317 B1* 6/2001 Pickornik et al. ........... 340/447
6,571,617 B1* 6/2003 Van Niekerk et al. ........ 73/146
6,591,672 B1* 7/2003 Chuang et al. ............. 73/146.8
6,631,637 B1* 10/2003 Losey .......................... 73/146
6,662,642 B1* 12/2003 Breed et al. .................. 73/146

FOREIGN PATENT DOCUMENTS

DE 196 24 800 A1 1/1997
EP 0 687 225 B1 12/1995

* cited by examiner

Primary Examiner—William Oen
Assistant Examiner—Andre Allen
(74) Attorney, Agent, or Firm—Baker Botts L.L.P.

(57) ABSTRACT

The invention relates to a device for measuring a tire pressure of a tire arranged on a rim (10), having a tire valve (14) arranged in a bore (12) in the rim (10), and a tire pressure sensor unit (16) arranged inside the tire and fastened on the tire valve (14), it being possible to fasten the tire pressure sensor unit (16) in various angular positions with reference to the tire valve (14).

It is provided according to the invention that an electric connection (18) exists between the tire pressure sensor unit (16) and the tire valve (14), and that the tire valve (14) is provided as an antenna for communicating with a receiver and/or transmitter arranged outside the tire.

19 Claims, 2 Drawing Sheets

DEVICE FOR MEASURING A TIRE PRESSURE

CROSS-REFERENCE TO RELATED APPLICATION

This application claims foreign priority benefits under 35 §U.S.C. 119 to German application number DE 10148876.9 filed Oct. 4, 2001.

BACKGROUND OF THE INVENTION

The invention relates to a device for measuring a tire pressure of a tire arranged on a rim, having a tire valve arranged in a bore in the rim, and a tire pressure sensor unit arranged inside the tire and fastened on the tire valve, it being possible, according to the embodiment, to fasten the tire pressure sensor unit in various angular positions with reference to the tire valve.

Devices of this generic type are used in order to monitor the tire pressures in the tires of motor vehicles. This can be performed such that use is made of an automatic monitoring system that outputs warnings upon undershooting or overshooting of critical values. A device of the generic type is also used to indicate the tire pressures continuously in the interior of the vehicle.

The measured values of the tire pressure sensor unit are transmitted in a wireless fashion to a receiver that then makes available the signals that are to be evaluated and/or displayed. In order to render possible such wireless transmission, it is necessary to provide in the region of the tire pressure sensor unit a transmitting antenna that can also serve occasionally as a receiving antenna, for example for receiving trigger signals. Such an antenna is generally permanently connected, as part of the tire pressure sensor unit, to an electronic printed circuit board of the tire pressure sensor unit. This is advantageous in some regards, in particular concerning the reliable electric connection of the antenna to the printed circuit board. This applies, chiefly, when, as in the case of the device of the generic type, it is possible to adjust the angle of the tire pressure sensor unit. In this case, the electric connection of the antenna to the tire pressure sensor unit is not influenced by the respective angular position.

In another regard, however, disadvantages have to be noted, since a printed circuit board antenna requires installation space as an additional component of the tire pressure sensor unit, and increases the complexity of the unit.

SUMMARY OF THE INVENTION

It is the object of the invention to eliminate the disadvantages of the prior art and, in particular, to make available a device for measuring a tire pressure with the aid of a pressure sensor unit whose angle can be adjusted, the pressure sensor unit being simplified with regard to the antenna function.

This object is achieved by a device for measuring a tire pressure of a tire arranged on a rim, having a tire valve arranged in a bore in the rim, and a tire pressure sensor unit arranged inside the tire and fastened on the valve, it being possible to fasten the sensor unit in various angular positions with reference to the valve, wherein an electric connection exists between the sensor unit and the valve, and the valve is provided as an antenna for communicating with a receiver and/or transmitter arranged outside the tire.

This object is achieved by a device for measuring a pressure of a tire arranged on a rim, said rim having a bore therein, said device comprising a tire valve arranged in the bore, and a tire pressure sensor unit arranged inside the tire in electrical communication with the valve, wherein said valve functions as an antenna for communicating to a location outside the tire.

This object is also achieved by a device for measuring the pressure of a tire arranged on a rim, said device comprising a tire valve arranged in a bore in the rim, and a tire pressure sensor unit in electrical communication with the valve, said unit capable of being fastened in various angular positions relative the valve, said valve functioning as an antenna for communicating with a receiver and/or transmitter outside the tire.

The invention is based on the device of the generic type by virtue of the fact that an electric connection exists between the tire pressure sensor unit and the tire valve, and that the tire valve is provided as an antenna for communicating with a receiver and/or transmitter arranged outside the tire. In this way, it is no longer necessary to provide a separate printed circuit board antenna inside the tire pressure sensor unit. Rather, an electric connection can be rendered possible between the tire pressure sensor unit and the tire valve in that the tire valve acts as an antenna. The electric connection can be designed, despite the angular adjustability of the tire pressure sensor unit, such that a reliable electric contact, and thus a reliable functioning of the device according to the invention are always ensured.

The device according to the invention is developed in a particularly advantageous way by virtue of the fact that the electric connection is designed as a metal plate, and that a screw connection exists between the tire pressure sensor unit and the tire valve, the metal plate being pressed by the screw connection. By pressing the metal plate that makes the electric connection available between the tire pressure sensor unit and tire valve it is ensured that the electric connection is made available in a reliable way owing to the force required to arrest the pressure sensor unit mechanically.

It is advantageous that the metal plate has a contact lug via which an electric connection exists with a printed circuit board of the tire pressure sensor unit. The contact lug can preferably be soldered on the printed circuit board such that an acceptable electric connection is present at this point. The electric connection of the printed circuit board to the tire valve is then made available in the way according to the invention by the force of the screw connection in the arrested state of the pressure sensor unit.

It can be advantageous for the metal plate to be sharp-edged in order to improve the electric connection to the tire valve. Such a sharp edge can be embodied, for example, in the manner of punching burrs. Since the conventional tire valves generally consist of aluminum alloys, the provision of sharp edges is advantageous because the sharp edges penetrate the aluminum oxide layer and thereby enable the valve to function as an antenna on the basis of its reliable electric connection.

It can likewise be useful for the electric connection to be designed as a wire and for there to be a screw connection between the tire pressure sensor unit and the tire valve, the wire being pressed by the screw connection. Such a wire is advantageously fixed in the housing of the tire pressure sensor unit in a half-side groove before the tire pressure sensor unit is mounted on the valve.

In an advantageous embodiment of the present invention, it is provided that the various angular positions of the tire pressure sensor unit with reference to the tire valve can be implemented via a cylindrical joint. Such a cylindrical joint in many cases renders it sufficiently possible to set the tire pressure sensor unit with reference to the valve and/or the rim, such that a favorable position of the tire pressure sensor unit with reference to the side cheeks of the rim base can, finally, be achieved.

It can also, however, be useful that the various angular positions of the tire pressure sensor unit with reference to the tire valve can be implemented via a ball-and-socket joint. Such a ball-and-socket joint offers more degrees of freedom with reference to the setting possibilities, such that the device can be used in an optimum way in conjunction with the most varied of rims.

The device according to the invention is developed in an advantageous way by virtue of the fact that the tire pressure sensor unit is fastened on the tire valve with the aid of a screw that has an axial through-bore, and that the through-bore serves the purpose of bleeding the tire. The tire valve therefore acts with a double function as nut for the screw. The screw likewise has a double function, since on the one hand it fastens the tire pressure sensor unit on the tire valve, and on the other hand it makes a bleeding opening available.

However, it can also be useful to provide in the tire valve a bypass bore running obliquely with reference to the axis of the tire valve in order to bleed the tire. In this case, it is possible to use a conventional screw without an axial through-bore, since the bleeding function is made available by the oblique bypass bore.

The invention is based on the finding that given a suitable electric connection to the tire pressure sensor unit, a tire valve can be used as an antenna for a device for measuring a tire pressure. In this case, different embodiments are possible which on the one hand permit particularly reliable electric connections between tire pressure sensor unit and tire valve, and on the other hand, can be used with different jointed arrangements, for example in the case of cylindrical joints and of ball-and-socket joints.

BRIEF DESCRIPTION OF THE DRAWINGS

The invention will now be explained by way of example with the aid of preferred embodiments with reference to the attached drawings, in which.

DETAILED DESCRIPTION OF THE INVENTION

Figure 1:
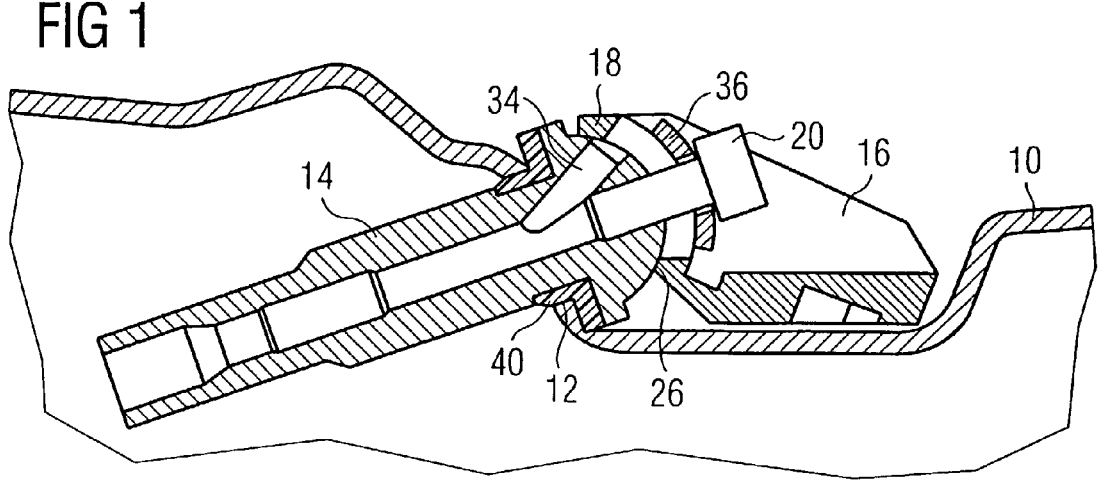
FIG. 1 shows a sectional view of a device according to the invention arranged in a tire.

FIG. 1 shows a sectional view of a device according to the invention arranged in a tire. A rim 10 has a bore 12 for holding a tire valve 14. A tire valve 14 is inserted into this bore 12 and sealed with the aid of a seal 40. The valve 14 has a bypass bore 34 for bleeding. A tire pressure sensor unit 16 is arranged in the interior of the space formed by the rim 10 and the tire (not illustrated). Said unit is connected to the tire valve 14 via a cylindrical joint 26. The angular position of the tire pressure sensor unit 16 with reference to the tire valve 14 or with reference to the rim 10 is fixed by means of a screw 20.

Furthermore, a thin metal plate 18 is pressed onto the tire valve 14 by the screw 20. This metal plate 18 makes available an electric connection between a printed circuit board 24 (not illustrated in FIG. 1—see FIG. 2) and the tire valve 14. The tire valve 14 can function in this way as an antenna. The pressing of the metal plate 18 onto the tire valve 14 by the screw 20 is supported by a press-on plate 36.

An alternative position of the metal plate to the possibility illustrated in FIG. 1 is an arrangement between the tire pressure sensor unit 16 and the press-on plate 36.

Figure 2:
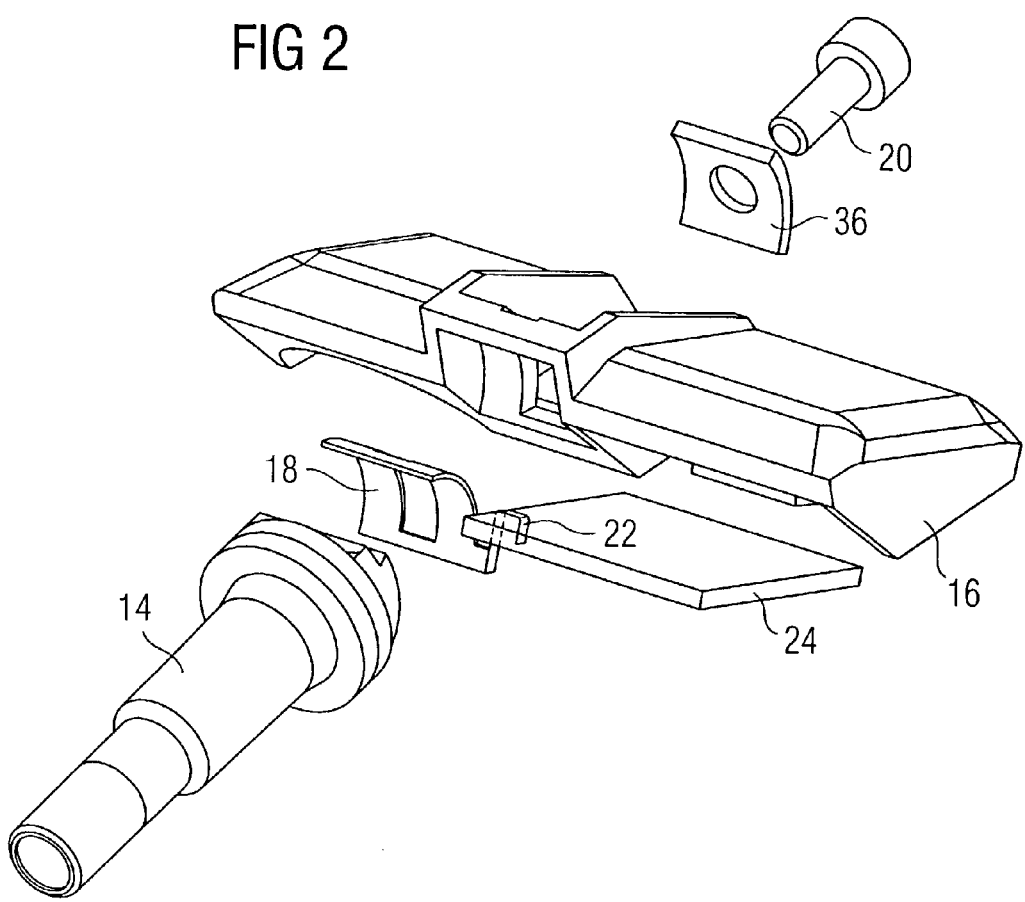
FIG. 2 shows a perspective exploded illustration of the device according to the invention in accordance with FIG. 1.

FIG. 2 shows a perspective exploded illustration of the device according to the invention in accordance with FIG. 1. On view are a tire valve 14, a metal plate 18, acting as electric connection, with a contact lug 22 that produces a contact with a printed circuit board 24, a tire pressure sensor unit 16 that accommodates the printed circuit board 24 in the assembled state, a press-on plate 36 and a screw 20. The screw 20 penetrates the tire pressure sensor unit 16 and the metal plate 18 through elongated openings, something which is rendered possible by the angular adjustment of the tire pressure sensor unit 16 with reference to the screw 14.

It is, for example, conceivable to form the punched edges of the elongated opening in the metal plate 18 in the direction of the tire valve 14 such that these punched edges permit an improvement of the electric connection, for example on the basis of the penetration of an aluminum oxide layer.

Figure 3:
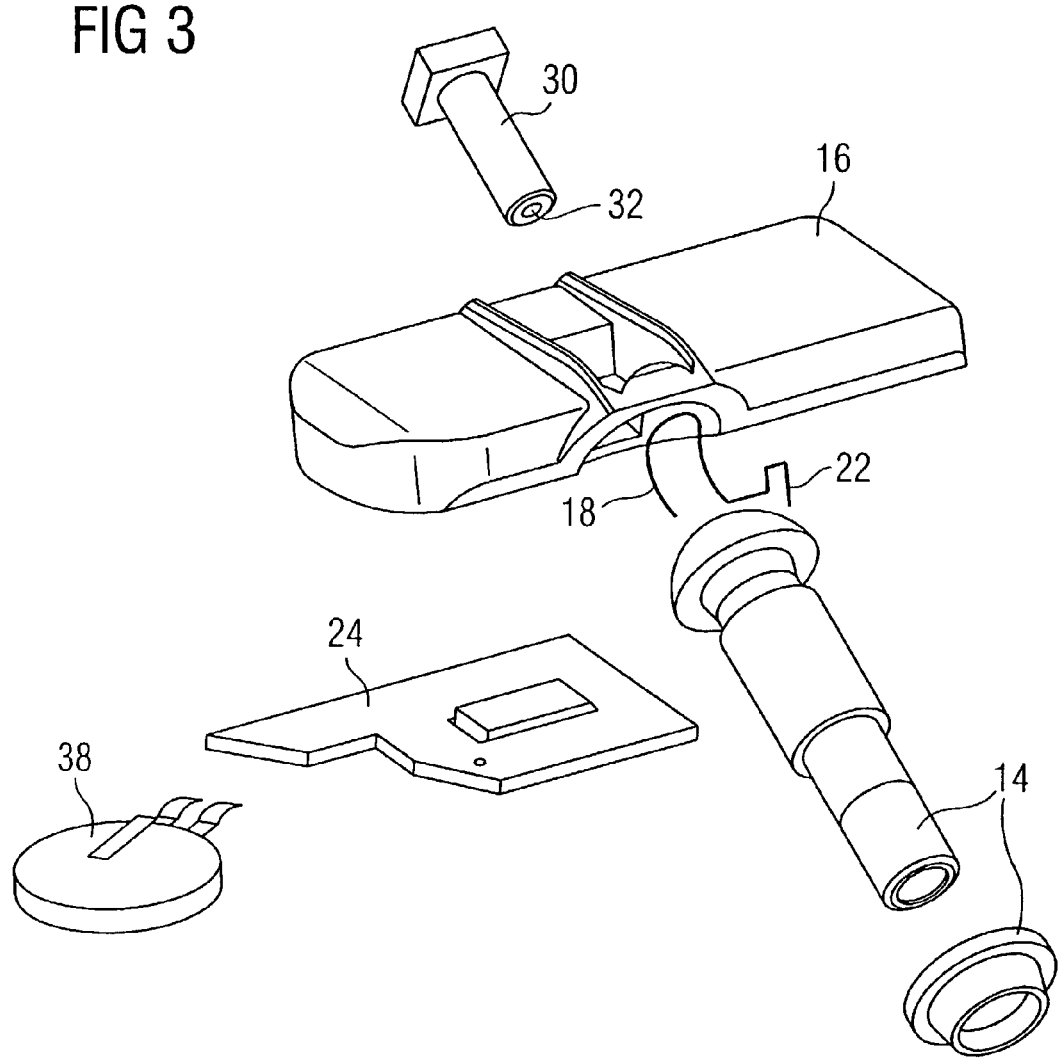
FIG. 3 shows a perspective exploded illustration of a further embodiment of a device according to the invention.

FIG. 3 shows a perspective exploded illustration of a further embodiment of a device according to the invention. In the present case, the joint between the tire valve 14 and the tire pressure sensor unit 16 is a ball-and-socket joint. Consequently, the metal plate 18 is formed with its contact lug 22 in such a way that it can be adapted to the various angular positions of the ball-and-socket joint, and thus is always available with a reliable connection. A printed circuit board 24 and a battery 38 supplying the device with energy may also be recognized. The printed circuit board 24 and/or the battery 38 are accommodated by the tire pressure sensor unit 16 in the assembled state.

The tire pressure sensor unit 16 is fixed on the tire valve 14 by a screw 30 with a screw head that is rectangular or square in radial cross section, as a result of which the metal plate 18 is simultaneously pressed on in order to ensure the electric contact. The rectangular shape of the head of the screw 30 prevents the screw 30 from turning in its state when inserted into the tire pressure sensor unit 16, such that suitable fixing can be performed by screwing on the valve 14 with a specific torque.

In the present case, the screw 30 has a through-bore 32 through which the tire can be aerated. Furthermore, by contrast with the embodiment in accordance with FIGS. 1 and 2 no press-on plate 36 (see FIGS. 1 and 2) is provided.

In the embodiment in accordance with FIG. 3, the metal plate 18 can be arranged between the tire pressure sensor unit 16 and the screw 14, or between the screw 30 and the tire pressure sensor unit 16.

In the case of the screw 30 illustrated in FIG. 3, the underside of the screw head, which exerts a force, acting in the axial direction, on the housing 16 is illustrated as being flat. It is likewise conceivable and occasionally advantageous for this surface to be formed as an internal spherical surface, that is to say concavely, and for the surface of the housing 16 that cooperates with this surface to be of correspondingly convex configuration. It is possible in this case, furthermore, for the curvatures of the concave surface and convex surface to correspond. Likewise, it can be advantageous to select the curvature of the screw head surface, that is to say the concave surface, to be greater than the curvature of the convex housing surface. An additional self-locking results in this case.

The features of the invention that are disclosed in the above description, in the drawings and in the claims can be important for implementing the invention both individually and in any desired combination.

The invention claimed is:

1. A device for measuring a tire pressure of a tire arranged on a rim, having a tire valve arranged in a bore in the rim, and a tire pressure sensor unit arranged inside the tire and fastened on the valve, the sensor unit operably fastened in various angular positions with reference to the valve, wherein an electric connection exists between the sensor unit and the valve, and the valve is provided as an antenna for communicating with a receiver and/or transmitter arranged outside the tire.

2. The device as claimed in claim 1, wherein the electric connection is designed as a metal plate, and a screw connection exists between the sensor unit and the valve, the metal plate being pressed by said screw connection.

3. The device as claimed in claim 2, wherein the metal plate has a contact lug via which an electric connection exists with a printed circuit board of the sensor unit.

4. The device as claimed in claim 2, wherein the metal plate is sharp-edged in order to improve the electric connection to the valve.

5. The device as claimed in claim 1, wherein the electric connection is designed as a wire, and a screw connection exists between the sensor unit and the valve, the wire being pressed by said screw connection.

6. The device as claimed in claim 1, wherein the various angular positions of the sensor unit with reference to the valve can be implemented via a cylindrical joint.

7. The device as claimed in claim 1, wherein the various angular positions of the sensor unit with reference to the valve implemented via a ball-and-socket joint.

8. The device as claimed in claim 1, wherein the sensor unit is fastened on the valve with the aid of a screw that has an axial through-bore for bleeding the tire.

9. The device as claimed in claim 1, further comprising a bypass bore running obliquely with reference to an axis of the valve in the valve for bleeding the tire.

10. A device for measuring the pressure of a tire arranged on a rim, said rim having a bore with a tire valve arranged therein, said device comprising:

a tire pressure sensor unit in electrical communication with the valve, said unit fastened in various angular positions relative the valve, said valve functioning as an antenna for communicating with a receiver and/or transmitter outside the tire.

11. The device of claim 10 wherein a metal plate is positioned between the unit and the valve.

12. The device of claim 11 wherein a screw connection exists between the unit and the valve such that when the screw connection is tightened the metal plate is pressed.

13. The device of claim 11 wherein the edges of said plate are sharp in order to improve the electrical connection with the valve.

14. The device of claim 10 wherein the unit and the valve are in electrical communication via a wire.

15. The device of claim 14 wherein a screw connection exists between the unit and the valve, said wire being pressed by said screw connection when said connection is tightened.

16. The device of claim 10 wherein the unit is adjustable with reference to the valve via a cylindrical joint.

17. The device of claim 10 wherein the unit is adjustable with reference to the valve via a ball-socket or cylindrical joint.

18. The device of claim 10 wherein the unit is fastened to the valve with the aid of a screw having an axial bore therethrough.

19. The device of claim 10 further comprising a bypass bore in the valve running obliquely with reference to the axis of the valve.

* * * * *